March 8, 1960     J. W. JOHNSON     2,927,819
SUN-SHADE FOR AUTOMOBILES
Filed April 10, 1958     3 Sheets-Sheet 1
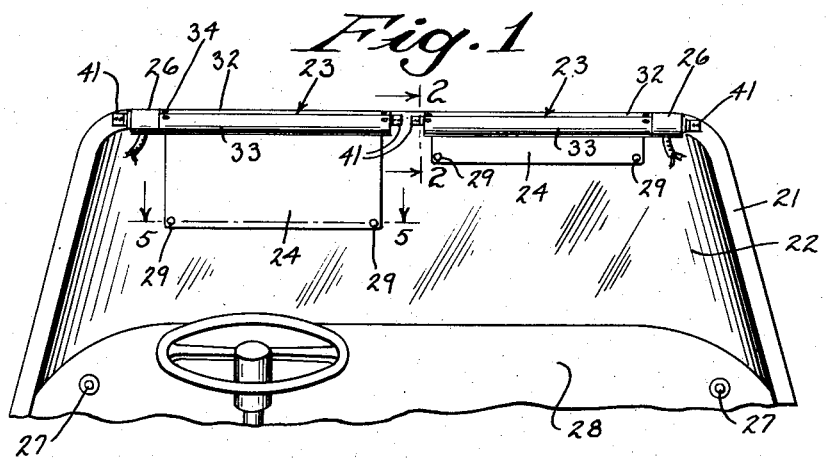
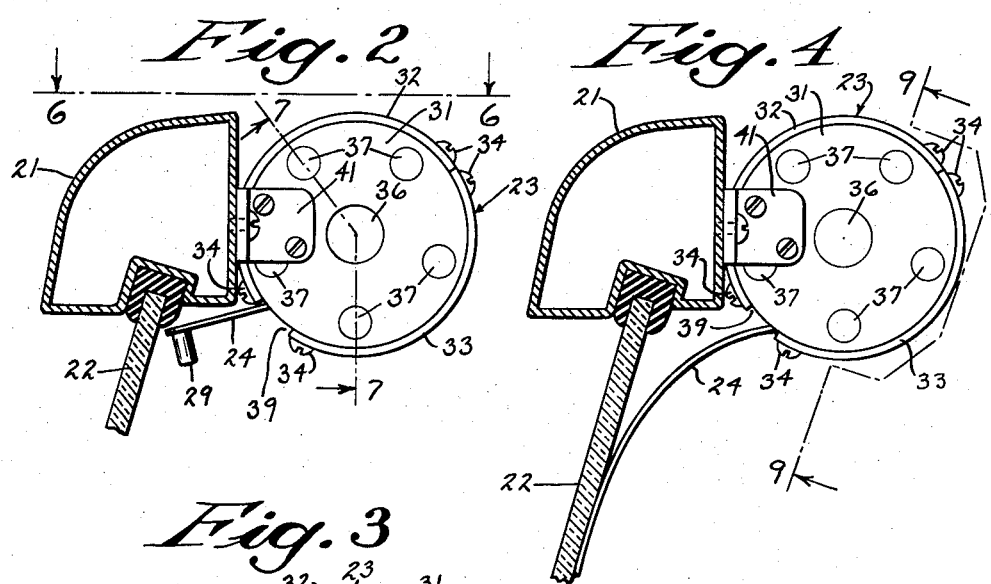
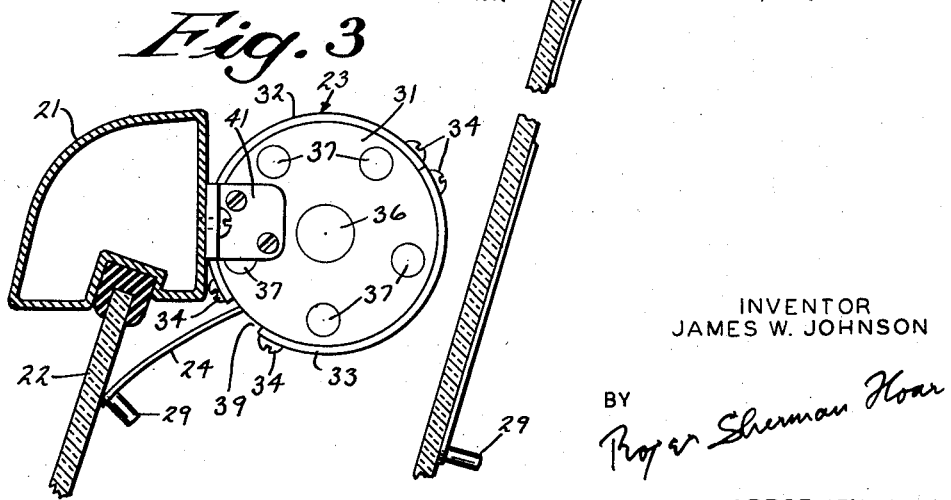
INVENTOR
JAMES W. JOHNSON
BY Roger Sherman Hoar
ATTORNEY March 8, 1960 J. W. JOHNSON 2,927,819
SUN-SHADE FOR AUTOMOBILES
Filed April 10, 1958 3 Sheets-Sheet 2
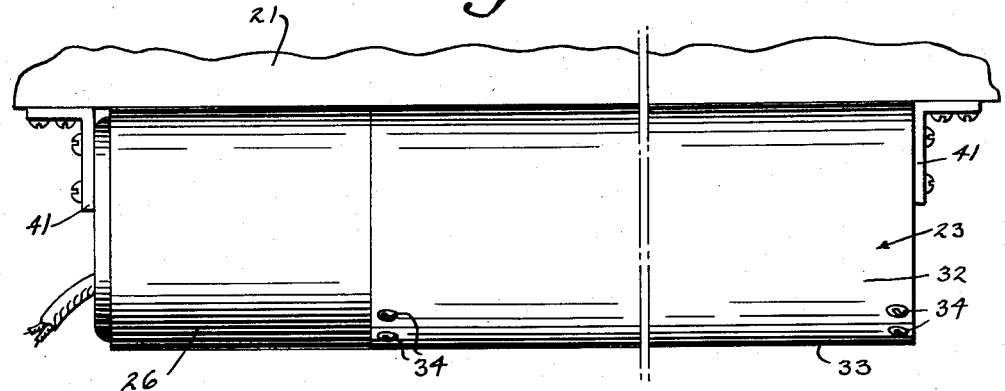
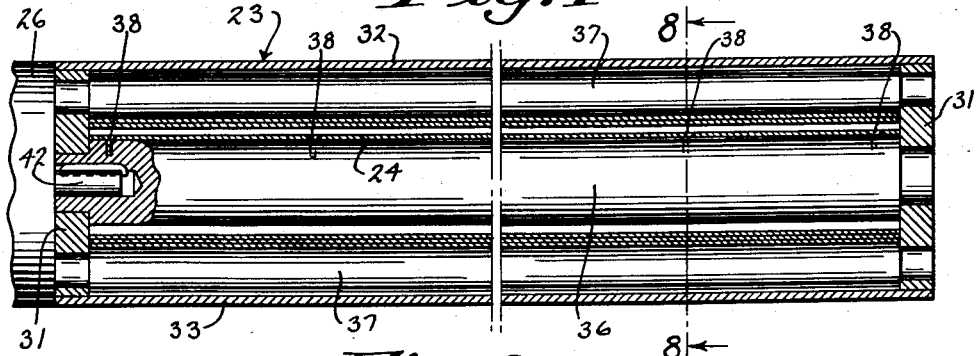
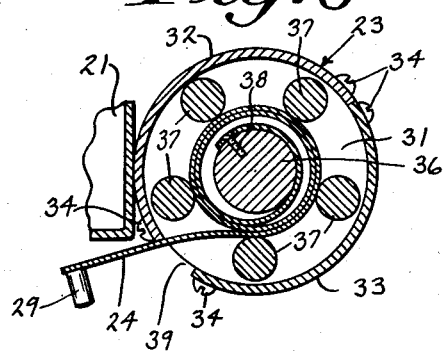
INVENTOR
JAMES W. JOHNSON
BY Roger Sherman Hoar
ATTORNEY March 8, 1960  J. W. JOHNSON  2,927,819
SUN-SHADE FOR AUTOMOBILES
Filed April 10, 1958  3 Sheets-Sheet 3
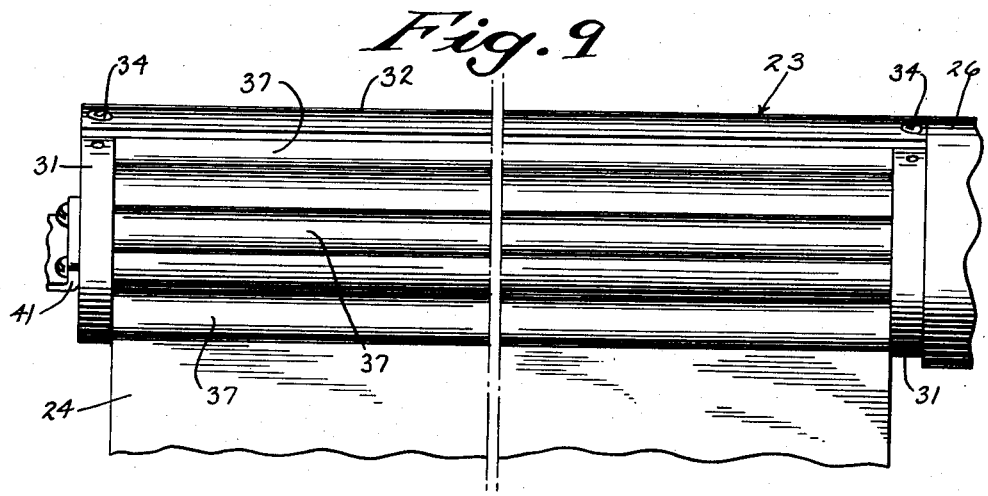
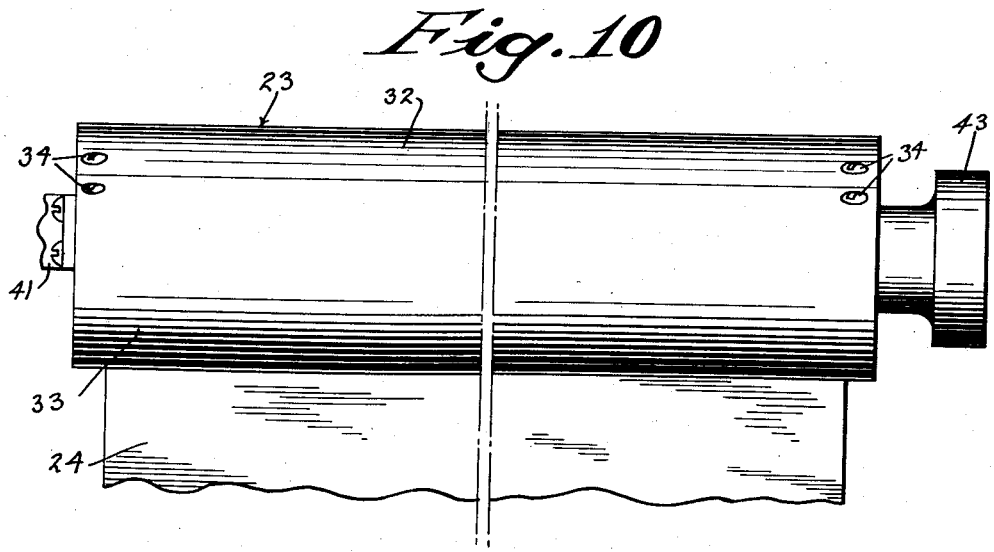
INVENTOR
JAMES W. JOHNSON
BY
ATTORNEY ent Office 2,927,819
Patented Mar. 8, 1960

2,927,819

SUN-SHADE FOR AUTOMOBILES

James W. Johnson, Socorro, N. Mex.

Application April 10, 1958, Serial No. 727,643

2 Claims. (Cl. 296—97)

This invention relates to a sun-shade for automobiles and more particularly to such a sun-shade which can be alternately readily rolled-up within a casing at the top of the windshield and readily extruded therefrom.

The conventional swinging sun-shade cannot be readily manipulated by the driver of the vehicle without diverting his attention from the road.

Accordingly the principal object of the present invention is to devise a sun-shade which is not subject to this difficulty.

Loose curtains, such as are sometimes employed on side and rear windows, have never been considered practical for windshields, not only because their flapping would disturb the driver, even if restrained by guiding cords at their side edges, but also because they would not conform to curved windshields. Even a stiff curtain is to a considerable extent unsatisfactory, none having heretofore been designed which will conform to curved windshields.

Accordingly it is a further object of the present invention to design a sun-shade which will conform to curved windshields.

Other objects and advantages will appear in the description which follows.

In the description, reference is made to the accompanying drawings, forming a part hereof, in which there are shown, by way of illustration and not of limitation, certain specific forms in which the machine of the present invention may be embodied.

In the drawings:

Fig. 1 is a rear elevation of a portion of an automobile, somewhat conventionalized, showing two sun-shades, according to the present invention, with their casings mounted on the frame of the windshield.

Fig. 2 is an end view of one of these sun-shades as seen from the line 2—2 of Fig. 1. The shade proper is shown barely extruded from its casing. Fig. 2 and all subsequent figures are drawn to a uniform more open scale than Fig. 1.

Fig. 3 is the same view, but with the shade proper somewhat more extruded.

Fig. 4 is the same view, but with the shade proper still further extruded.

Fig. 5 is a horizontal section of windshield and shade proper, as seen from the line 5—5 of Fig. 1.

Fig. 6 is a plan view of the sun-shade casing attached to the windshield frame.

Fig. 7 is a longitudinal section of the sun-shade as cut along the line 7—7 of Fig. 2.

Fig. 8 is a transverse section of the sun-shade as cut along the line 8—8 of Fig. 7.

Fig. 9 is a rear view of the invention, viewed as seen from the line 9—9 of Fig. 4, but with one section of the cover removed.

Fig. 10 is a rear elevation of a manually operated variant of the invention.

Throughout the description, the same reference numeral is applied to the same member or similar members.

Turning now to the drawings, and more particularly Fig. 1, it will be seen that 21 is the frame of the windshield of an automobile, and 22 is the windshield glass. 23 is the casing of a sun-shade, which casing is secured to frame 21. Extending from casing 23 is the shade proper 24. 26 is an electric motor for extruding and retracting the shade proper. This motor may be controlled by push-button 27 on dashboard 28. Two shades and associated items, just listed, are shown in Fig. 1, one shade proper being further extruded than the other.

The shade proper 24 is made of a sheet of resilient opaque material, such as very thin spring steel, normally substantially flat, and should be provided with appropriate means (such as stops 29) for preventing it from becoming wholly retracted within the casing.

The casing is tubular, preferably cylindrical, and should be long enough to contain the width of the shade, and of a diameter sufficient to contain the mechanism now to be described, and the rolled-up shade. It may conveniently consist of two end plates 31, and an upper and lower cover-plate 32, 33, secured to the end plates, as by screws 34.

See Figs. 7 and 8. Extending lengthwise within the casing is a shaft 36. Spaced outwardly from and surrounding this shaft are a plurality of rollers 37. Shade 24 is secured along one edge thereof to shaft 36, as by screws 38, and is wound around shaft 36 within rollers 37 several times, and then projects through gap 39 between the edges of cover-plates 32 and 33. Shaft 36 and rollers 37 are journaled in end plates 31. The attachment of shade 24 to shaft 36 constitutes means to limit the extrusion of the shade.

Due to shade 24 being normally flat, then were it not for rollers 37, rotation of shaft 36 to extrude shade 24 would cause the shade to act like an expanding brake the inside of cover-plates 32 and 33, thus rendering extrusion practically impossible.

Means, such as brackets 41, should be provided to secure the casing to the frame of the automobile. The attaching means should be so located with respect to the casing and the frame that the shade as initially extruded will approach the glass of the windshield at such and angle as to have a material component parallel to, and a material component perpendicular to, the surface of the glass, and hence the outer edge of the shade will tend to contact and slide along the glass away from the casing as the shade is further extruded.

It is also highly advisable that the shade be wound about the shaft in such a direction that the shade be given a reverse bend as it contacts the glass.

As shown in Figs. 4 and 5, the resiliency of shade 24, and its normal flatness, and its consequent natural tendency to extend in the direction in which it initially approached the glass, each contribute to the tendency of the shade to cling to the glass, even though the glass be curved.

The reverse bend already alluded to, will tend to offset any tendency of the shade to lose its natural flatness by remaining coiled-up for long periods of time. In fact a slight loss of natural flatness will even enhance the clinginess of the shade.

The shaft 42 of motor 26 can be drivingly keyed to shaft 36, as shown in Fig. 8.

Fig. 10 is a rear view of a manually-operated variant of the invention, 43 being a hand-knob to take the place of motor 26.

It should be noted that the casing of the present invention is inherently capable of being located between the metal top of a closed car and the upholstery of its ceiling, thus the shade as well as the casing will be out of sight when the shade is retracted.

Now that two embodiments of the invention have been shown and described, it is to be understood that the invention is not to be limited to the specific forms or arrangements of parts herein shown and described.

What is claimed is:

1. In a sun-shade for an automobile having a windshield and a frame thereabout, the combination of an elongated casing defining a longitudinal slot in a wall thereof; a longitudinal rotatable shaft located in said casing; a plurality of rollers within the casing radially spaced from said shaft and being substantially evenly spaced from one another; said shaft and said rollers being journally supported at their respective opposite ends by said casing; a shade proper, of thin normally flat, opaque, stiff, resilient material, secured along one edge thereof to said shaft, thence wound about the shaft within the rollers, thence projecting outwardly through the slot; means for rotating the shaft to unwind and to wind the shade proper relative to the slot; and means for securing the casing to the frame surrounding the said windshield, said securing means being arranged for mounting of the casing in substantially parallel, adjacent relationship with the windshield frame and with the casing slot opening towards the windshield and at an angle relative thereto; whereby the shade proper will be extruded from said slot during unwinding thereof and will angularly approach the windshield to provide a material component parallel to and a material component perpendicular to the surface of said windshield with the outer edge of the shade proper tending to contact and slide along the windshield away from the casing and conform to the general contour of the windshield as the shade proper is unwound from the said shaft and extruded from the said casing slot.

2. A sun-shade according to claim 1, wherein the shade proper is wound about the shaft in such a direction that the shade proper is given a reverse bend as it contacts the glass.

References Cited in the file of this patent

UNITED STATES PATENTS

| 804,641 | Wallen | Nov. 14, 1905 |
| 1,793,195 | Roberts | Feb. 17, 1931 |
| 1,794,771 | Huffman | Mar. 3, 1931 |
| 1,932,475 | Peteler | Oct. 31, 1933 |
| 2,559,471 | Schrock | July 3, 1951 |
| 2,726,114 | Jacobi et al. | Dec. 6, 1955 |

FOREIGN PATENTS

| 876,647 | Germany | May 15, 1953 |